(12) United States Patent
Ogura et al.

(10) Patent No.: US 8,786,254 B2
(45) Date of Patent: Jul. 22, 2014

(54) BATTERY CHARGER

(75) Inventors: Hironori Ogura, Anjo (JP); Mamoru Sakai, Anjo (JP)

(73) Assignee: Makita Corporation, Anjo-shi (JP)

( * ) Notice: Subject to any disclaimer, the term of this patent is extended or adjusted under 35 U.S.C. 154(b) by 367 days.

(21) Appl. No.: 13/279,638

(22) Filed: Oct. 24, 2011

(65) Prior Publication Data

US 2012/0098494 A1 Apr. 26, 2012

(30) Foreign Application Priority Data

Oct. 26, 2010 (JP) ................................. 2010-239679

(51) Int. Cl.
*H02J 7/00* (2006.01)
(52) U.S. Cl.
USPC .......................................... 320/113; 320/112
(58) Field of Classification Search
CPC ....................................................... Y02E 60/12
USPC ................................................. 320/112, 113
See application file for complete search history.

(56) References Cited

FOREIGN PATENT DOCUMENTS

| EP | 1 414 127 A2 | 4/2004 | | |
|---|---|---|---|---|
| EP | 1414127 A2 | * 4/2004 | ................ | H02J 7/00 |
| JP | A-9-85784 | 3/1997 | | |
| JP | A-2005-294362 | 10/2005 | | |
| JP | 2009-296724 A | * 12/2009 | ................ | H02J 7/00 |
| JP | A-2009-296724 | 12/2009 | | |
| WO | WO 2008/029959 A1 | 3/2008 | | |
| WO | WO2008/029959 A1 | * 3/2008 | ................ | H02J 7/00 |

OTHER PUBLICATIONS

Extended Search Report issued in European Patent Application No. 11186475.7 dated Jun. 14, 2013.

* cited by examiner

*Primary Examiner* — Edward Tso
*Assistant Examiner* — Ahmed Omar
(74) *Attorney, Agent, or Firm* — Oliff PLC

(57) ABSTRACT

Female guide portions for slidingly attaching a battery pack are formed by integral molding of a case main body. Exposed step portions are formed on the female guide portions, which includes protruding portions as thin-walled portions by application from the outer side (the upper side) of a mold so as to reduce the thickness of a thick-walled resin portion. An opening communicating with the inner and outer side of the case is not provided, while the protruding portions are formed as thin-walled portions. Bottom surfaces of the exposed step portions are formed so as to be sloped with respect to the horizontal direction when the battery charger is placed on a horizontal base, and water dropped on the bottom surfaces can flow outside of the case due to the slope without remaining thereon.

8 Claims, 7 Drawing Sheets

BATTERY CHARGER

This application claims priority to Japanese patent application serial number 2010-239679, the contents of which are incorporated herein by reference.

BACKGROUND OF THE INVENTION

1. Field of the Invention

The present invention relates to a battery charger for charging a battery pack formed so as to be attachable to a tool main body of an electric tool as a power source of the electric tool.

2. Description of the Related Art

In an electric tool such as a hand-held charging type driver, a battery pack is attached to the tool main body as the power source. This battery pack is detached from the tool main body and can be charged by a separate battery charger. When charging the battery pack by the separate battery charger, the battery pack is attached to the battery charger as well as to the tool main body. The battery pack is slidingly attached to the tool main body (hereinafter referred to as sliding attachment), and when the battery pack is charged by the battery charger, the battery pack is attached to the battery charger in the same way as it is attached to the tool main body (the same sliding attachment). For this purpose, as disclosed in Japanese Laid-Open Patent Application No. 2009-296724, the battery charger is provided with a guide portion extending in the sliding direction in order to guide a sliding attachment portion of the battery pack. Further, the above-mentioned guide portion is formed by resin molding, which means that it must be molded into a thin-walled shape so that it may not produce a sink mark at the time of resin molding. In view of this, in the prior art, a mold is applied to the guide portion from the inner side (lower side) toward the outer side (upper side) so as to reduce the thickness of the thick-walled resin portion (wall thinning), thus forming the guide portion as a thin-walled portion.

When an attempt is made to apply the mold to the guide portion from the inner side (lower side) toward the outer side (upper side), an opening communicating with the inner and outer sides of the case will be allowed to be formed in the opposing portion of the inner side (lower side) of the guide portion. Then, if some water is splashed onto the battery charger, the water may be allowed to enter inside of the case through the opening. In view of this, in such a case, a drainage path is provided so that the water can be drained without affecting functions of a built-in component, which may result in a rather complicated structure in an inner side of the case.

One way to simplify the structure in the inner side of the case is to apply a mold to the guide portion from the outer side (upper side) toward the inner side (lower side) so as to thin the thick resin wall from the outer side (upper side) of the guide portion, thereby forming the guide portion as a thin-walled portion.

However, an attempt to reduce the thickness of the thick resin portion from the outer side (upper side) of the guide portion would result in the outer (upper portion) of the guide portion being formed in a concave configuration. Then, due to this concave configuration, water would likely to be gathered and retained and dust would be likely to be accumulated on the outer side (upper side) portion of the guide portion.

Thus, there is a need in the art to provide a guide portion for sliding attachment of the battery pack as a part of a case by integral resin molding, and to form the guide portion as a thin-walled portion without having to provide an opening communicating with the inner and outer sides of the case, which can solve the problem of water retention and dust accumulation on the guide portion.

SUMMARY OF THE INVENTION

One construction for a battery charger for charging a battery pack formed so as to be attachable to a tool main body of an electric tool as a power source of the electric tool can include a case serving as a casing of the battery charger that has a guide portion for slidingly attaching the battery pack formed as a part of the case by resin molding. The guide portion has an exposed step portion, with at least a recessed portion of the exposed step portion being formed so as to be sloped with respect to a horizontal direction when the battery charger is placed on a horizontal base.

According to this construction, the guide portion for slidingly attaching the battery pack is formed by resin molding as a part of a case serving as the casing of the battery charger. Further, a mold is applied to this guide portion so as to reduce the thickness of the thick resin portion from outside to form the guide portion as a thin-walled portion, whereby there is formed an exposed step portion which can help to prevent from producing a resin sinking at the time of molding. Thus, due to the stepped configuration of the exposed step portion, it is possible to form the guide portion as a thin-walled portion so as to prevent from producing the resin sinking at the time of resin molding without providing any opening communicating with the inner and outer sides that allows water to enter inside of the case. Further, at least the recessed portion of this exposed step portion is formed so as to be sloped with respect to the horizontal direction when the battery charger is placed on a horizontal base, and when water is retained or dust is accumulated on this recessed portion, a one-sided movement of the water or the dust toward the lower side of the slope can be made due to the slope of this recessed portion.

As a result, the water or the dust can be easily drained outside due to this slope. Thus, in providing the guide portion for slidingly attaching the battery pack as a part of the case by integral resin molding, it is possible to form the guide portion as a thin-walled portion without having to provide an opening communicating with the inner and outer sides of the case. Further, it is possible to solve the problem that water is retained and dust is accumulated on the guide portion.

According to another construction, a drainage path is formed at a lower end of the slope of the recessed portion of the exposed step portion.

According to this construction, the drainage path that leads outside is formed at least at the lower end of the slope of the recessed portion of the exposed step portion, and it is possible to drain the water or the dust through the drainage path along the sloped part without blocking the water or the dust. That is, the drainage path is formed such that the moving direction of the water or the dust on the recessed portion corresponds to the direction in which the water or the dust is drained outside, and thus it possible to drain the water or the dust outside through a series of flows. As a result, it is possible to drain outside almost all the water or the dust retained on the recessed portion of the exposed step portion.

According to another construction, the drainage path has a slit-like configuration.

According to this construction, the drainage path has a slit-like configuration and the drainage path can be formed integral with the case. As a result, there is no need to provide a separate process for forming the drainage path, which is advantageous from the viewpoint of the production of the case.

According to another construction, an upper surface of the case is formed so as to be sloped with respect to the horizontal direction so that the water that is drained outside from the exposed step portion may be caused to flow.

According to this construction, the upper surface of the case is formed so as to be sloped with respect to the horizontal direction so that the water drained outside from the exposed step portion may be caused to flow as described above, and thus the water drained from the recessed portion of the exposed step portion can be prevented from retaining on the upper surface of the case, and also the dust can be prevented from accumulating on the upper surface of the case. As a result, it is possible to leave the upper surface of the case in a clean condition, with no water or dust being retained or accumulated thereon.

According to another construction, there is formed a water passage in a side surface of the ease in the form of a recessed groove, which causes the water to flow out of the upper surface of the case toward a surface on which the battery charger is placed.

According to this construction, the water passage in the form of a recessed groove is formed in the side surface of the case, and thus it is possible to cause the water to flow out of the upper surface of the case toward the surface on which the battery charger is placed (e.g., the ground surface). As a result, the water and the dust can be caused to flow outside the battery charger, leaving the case in a clean condition.

As described above, one construction can include the guide portion for slidingly attaching the battery pack as a part of the case by integral resin molding, and the guide portion can be formed as a thin-walled portion without having to provide an opening configuration communicating with the inner and outer sides of the case, which can solve the problem of the water being retained and the dust being accumulated on the guide portion.

According to another construction, it is possible to drain outside almost all of the water and the dust retained or accumulated in the recessed portion of the exposed step portion.

According to another construction, there is no need to provide another process for forming the drainage path separately, which is advantageous from the viewpoint of the production of the case.

According to another construction, no water or dust is allowed to be retained or accumulated, making it possible to leave the upper surface of the case in a clean condition.

According to another construction, it is possible to flow the water and the dust outside of the battery charger, leaving the case in a clean condition.

DETAILED DESCRIPTION OF THE INVENTION

Each of the additional features and teachings disclosed above and below may be utilized separately or in conjunction with other features and teachings to provide an improved battery charger. Representative examples of the present teaching, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings.

Figure 1:
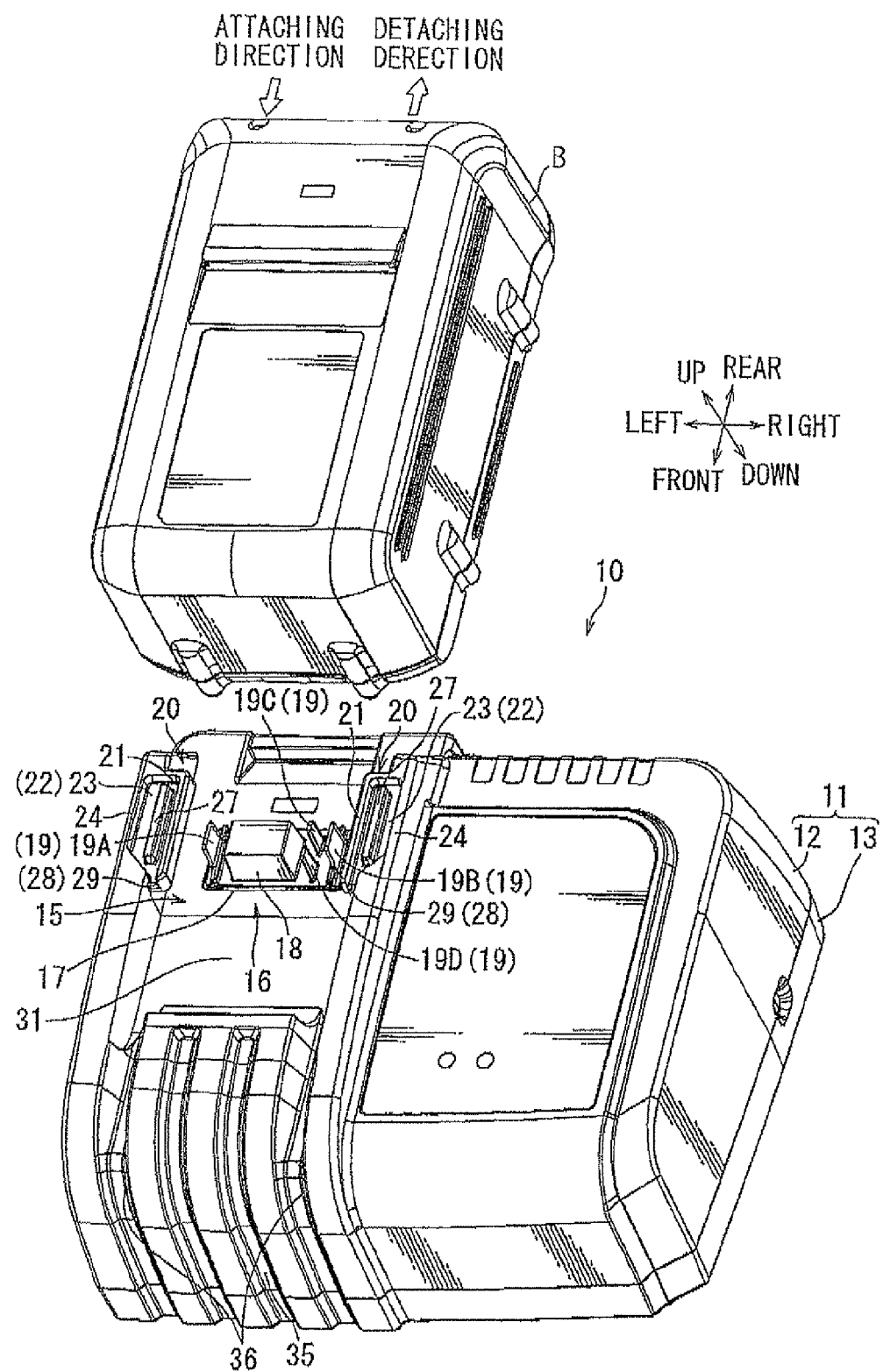
FIG. 1 is an external perspective view of a battery pack and a battery charger.

In the following, a battery charger according to one example of the present invention will be described with reference to the drawings. FIG. 1 is an external perspective view of a battery charger 10 and a battery pack B before the battery pack B is attached to the battery charger 10. In order that the following explanation of the battery charger 10 may be easily understood, up (upward or upper), dawn (downward or lower), front (frontward), rear (rearward), right (rightward), and left (leftward) in FIG. 1 to FIG. 7 are determined based on the direction in which the battery pack B is attached. That is, as shown in the drawings, an attachment side of the battery pack B corresponds to an upper side, and the direction in which the battery pack B is caused to slide to attach to the battery charger corresponds to the front side. As shown in FIG. 3 to FIG. 6, the battery charger 10 is placed on a ground surface which corresponds to the placing surface of a horizontal base according to the present invention.

Although not particularly shown, the battery pack B shown in FIG. 1 is attachable to the tool main body of an electric tool such as a band-held chargeable type driver as the power source of the electric tool. For this purpose, although not shown in detail, the battery pack B can be slidingly attached to the tool main body of an electric tool (hereinafter referred to as the sliding attachment). By the construction that allows the sliding attachment, the battery pack B can also be slidingly attached to the battery charger 10 described below.

Although not shown in detail in FIG. 1, the battery pack B is provided with a male guide portion configured to guide a sliding attachment portion to a battery attachment portion 15 of the battery charger 10. This male guide portion is provided in correspondence with a female guide portion 20 provided on the battery attachment portion 15 of the battery charger 10 described below. The male guide portion (not shown) is provided symmetrically in a battery pack width direction (the horizontal direction in the drawing) with regard to the attaching direction of the battery pack B. The male guide portions are formed in a male structure configured to be slidably fit-engaged with the female guide portions 20. As shown in FIG. 1, the attaching direction of the battery pack B with respect to the battery attachment portion 15 of the battery charger 10 is from the rear side toward the front side of the battery charger 10.

Figure 2:
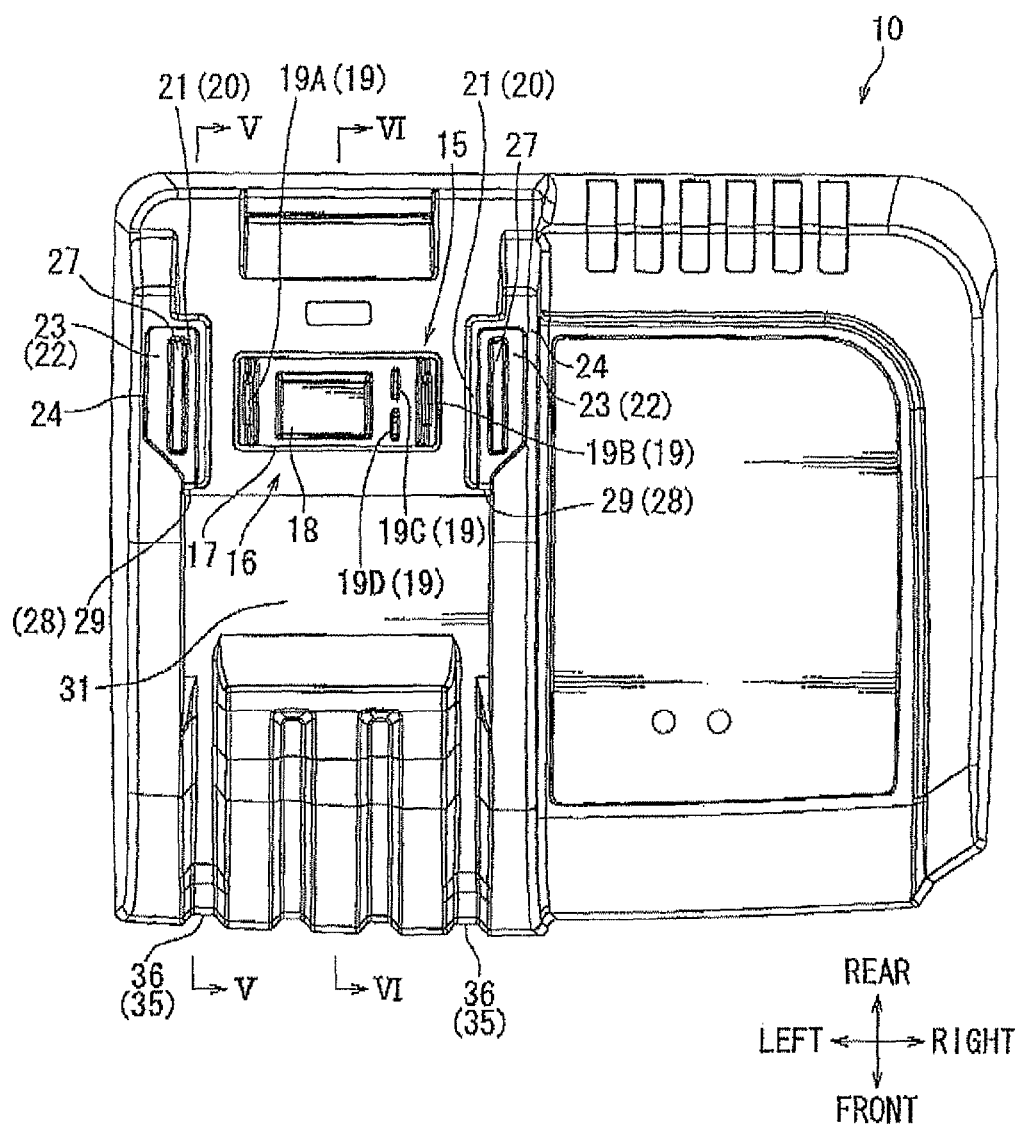
FIG. 2 is a plait view of the battery charger.
Figure 3:
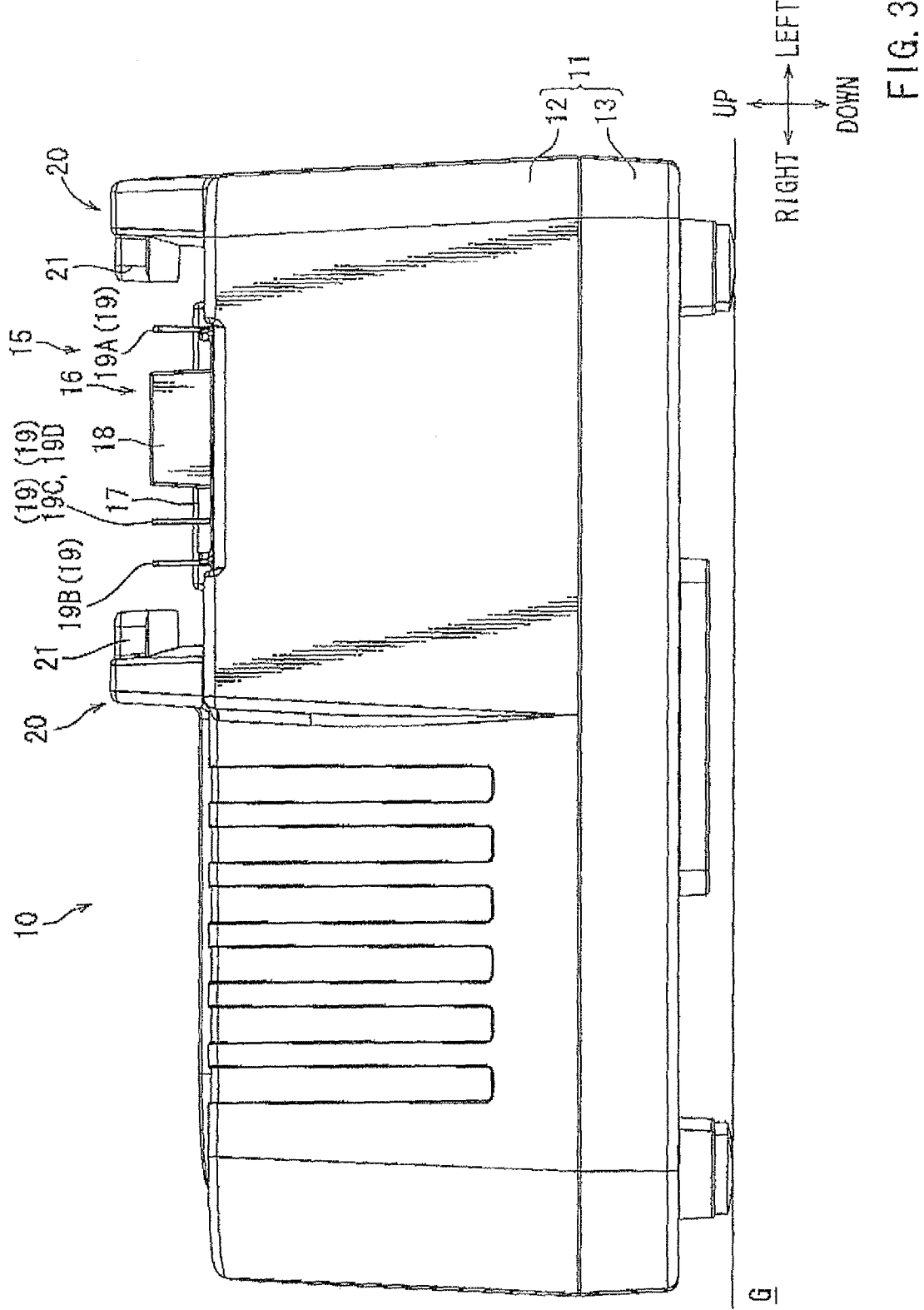
FIG. 3 is a side view of the battery charger showing a surface of the rear side with respect to the attaching direction of the battery pack.
Figure 4:
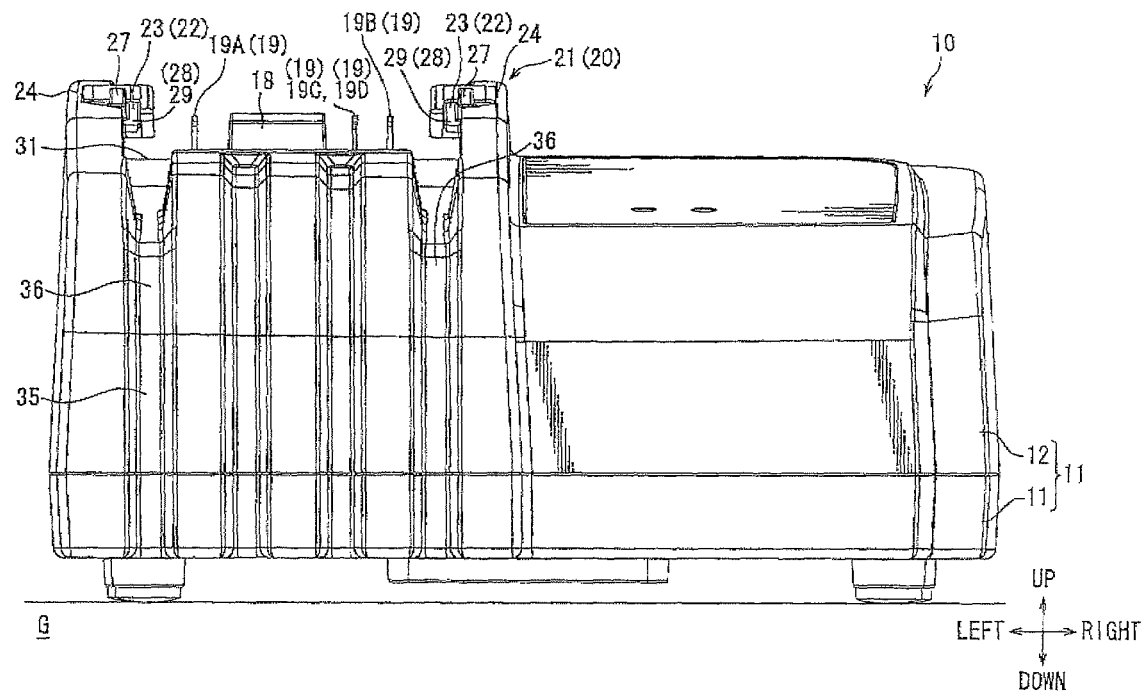
FIG. 4 is a side view of the battery charger showing a surface of the front side with respect to the attaching direction of the battery pack attaching.

As stated above, the battery charger 10 shown in FIG. 1 is a purpose-built battery charger for charging the battery pack B. In view of this, the battery charger 10 is formed so as to allow the sliding attachment of the battery pack B detached from the tool main body (not shown). The battery pack B slidingly attached to the battery charger 10 can be charged by this battery charger 10. FIG. 2 to FIG. 4 are external views of the battery charger 10. FIG. 2 is a plan view of the battery charger 10, and FIG. 3 is a side view of the battery charger 10, showing the rear side surface in the battery pack B. FIG. 4 is a side view of the battery charger 10, showing the front side surface in the battery pack B.

As shown in FIG. 1 to FIG. 4, the battery charger 10 is provided with a case 11, and various electrical components that function as the battery charger are housed in the case 11. The case 11 includes a case main body 12 having an upper surface and side surfaces of the case, and a bottom plate portion 13 having a bottom surface of the case. A plastic resin such as polyphenylene ether (PPE) can be used as the material of the case main body 12 and the bottom plate portion 13. They are produced by molding of the plastic resin. The case 11 including the case main body 12 and the bottom plate portion 13 is not provided with an air inlet for cooling the electrical components contained therein.

On the left-hand half of the upper surface of the case main body 12, there is formed the battery attachment portion 15 for the sliding attachment of the battery pack B. When resin molding is made to produce the case main body 12, the battery attachment portion 15 is formed as a part of the case main body 12 by integral molding. The battery attachment portion 15 is formed in a recessed configuration so as to allow the sliding attachment of the battery pack B.

In the central portion of the battery attachment portion 15, there is provided an electrical connection portion 16 configured to, be electrically connected to the battery pack B when the battery pack B is slidingly attached. The electrical connection portion 16 is provided substantially at the center of the battery attachment portion 15, and is adapted to be electrically connected to an electrical connection portion (not shown) of the battery pack B. More specifically, the electrical connection portion 16 is provided with a base portion 17, a block 18 for preventing an improper attachment, and four connection terminals 19 (19A, 19B, 19C, and 19D). A surface of the base portion 17 is formed to be higher by some extent (one step) than the upper surface 31 of the case 11 in the vertical direction, and is formed as a part of the case main body 12 by integral molding, while supporting and fixing the block 18 and the four connection terminals 19 (19A, 19B, 19C, and 19D). In the electrical connection portion 16, a floating structure in the prior art is not adopted, and the arrangement is made so as to maintain a hermetic structure of the inside of the base 11 with respect to the battery attachment portion 15 of the case main body 12. The block 18 formed integral with the base portion 17 for preventing an improper attachment serves to protect the connection terminals 19 against any foreign matter from outside, and also serves to prevent any other battery pack than the purpose-built battery pack B from being inserted by mistake. For this purpose, the improper attachment regulation block 18 is formed to protrude by an amount substantially the same as or larger than the protruding amount of the connection terminals 19. The electrical connection portion 16 of the battery charger 10 is provided with the four connection terminals 19 (19A, 19B, 19C, and 19D). Of the four connection terminals 19A, 19B, 19C, and 19D, two connection terminals 19A and 19B are used as electrical connection terminals for charging the battery pack B, and the remaining two connection terminals 19C and 19D are used as electrical connection terminals for controlling the battery pack B. In the electrical connection portion 16, a protective cover serving to protect the electrical connection portion 16 is not provided, and thus, a support structure for supporting such a protective cover is not used in the case main body 12.

On the left side and the right sides of the battery attachment portion 15, there are provided the female guide portions 20 for guiding the battery pack B for the sliding attachment. As described above, the female guide portions 20 are formed so as to be slidably fit-engaged with the male guide portions (not shown) of the battery pack B. The battery attachment portion 15 is formed as a part of the case main body 12, so that the female guide portions 20 are also formed as a part of the case main body 12 by integral molding at the time of resin molding for producing the case main body 12. That is, the female guide portions 20 correspond to the guide portions for slidingly attaching the battery pack B according to the present invention.

The female guide portions 20 are formed symmetrically in a lateral direction corresponding to the male guide portions (not shown) of the battery pack B. That is, the female guide portions 20 serves to guide the battery pack B for the sliding attachment, allowing the battery pack B to move only in the longitudinal direction and preventing the movement in the lateral direction of the battery pack B. For this purpose, the female guide portions 20 are formed in a female structure allowing slidable fit-engagement with the above-mentioned male guide portions.

More specifically, as shown in FIG. 2 to FIG. 4, the female guide portions 20 are formed by providing protruding portions 21 protruding inwardly from both the right and left sides of the battery attachment portion 15. Further, as shown in FIG. 3 and FIG. 4, the protruding portions 21 are formed so as to be spaced away from the battery attachment portion 15 and also formed in a concave configuration. Due to this arrangement, the female guide portions 20 serves as a female structure. The female guide portions 20 of the battery attachment portion 15 thus formed in a female structure allows slidable fit-engagement with the male guide portions (not shown) of the battery pack B.

Figure 5:
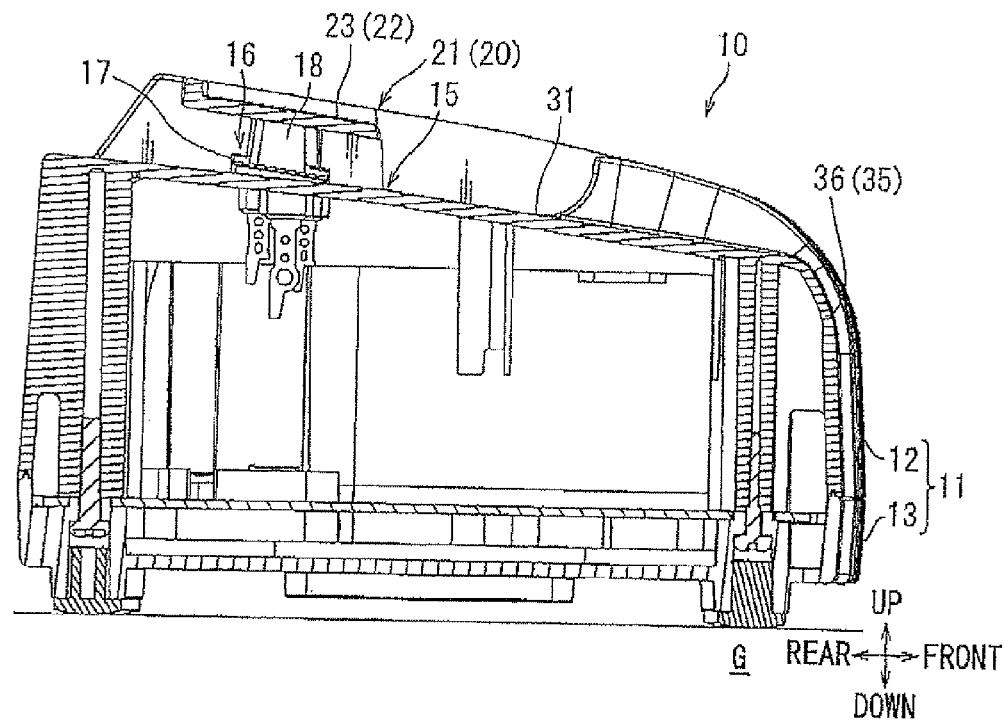
FIG. 5 is a sectional view of the battery charger taken along the arrow line V-V of FIG. 2.
Figure 6:
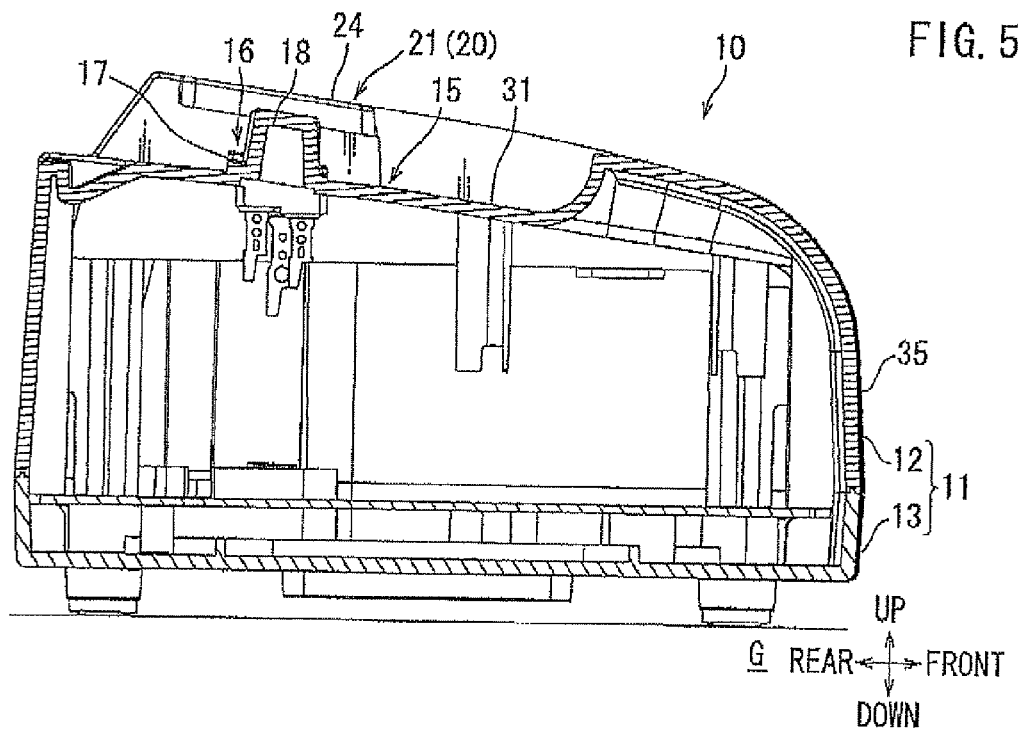
FIG. 6 is a sectional view of the battery charger taken along the arrow line VI-VI of FIG. 2.

FIG. 5 is a sectional view of the battery charger 10 taken along the arrow line V-V of FIG. 2. Further, FIG. 6 is a sectional view of the battery charger 10 taken along the arrow line VI-VI of FIG. 2. The above-mentioned protruding portions 21 forming the female guide portions 20 are formed as follows.

As shown in FIG. 5 and FIG. 6, the protruding portions 21 forming the female guide portions 20 are formed in a stepped configuration in which the wall thickness of the protruding portions 21 is small by application of a mold from outside (upper side). By molding in a stepped configuration, the protruding portions 21 serving as the female guide portions 20 are molded so as to reduce the thickness of the thick-walled resin portions from the outside (the upper side). And, there are formed exposed stepped portions 22 in the protruding portions 21, which are exposed outwardly (upwardly). More specifically, the exposed step portions 22 are formed to be provided with bottom surfaces 23, the height of which is lower by some extent (one step) than that of its periphery, so as to be surrounded by the side surfaces in the periphery. The bottom surfaces 23 are portions corresponding to the recessed portions of the exposed step portions 22 according to the present invention. Substantially at the middle portions of the bottom surfaces 23, there are provided partition ribs 27 which divide the bottom surfaces into two sections substantially at the middle portions in the lateral direction. The partition ribs 27 of the exposed step portions 22 are formed so as to extend in the longitudinal direction (attaching and detaching direction) as seen in the drawings. Further, as shown in FIG. 5 and FIG. 6, the bottom surfaces 23 of the exposed step portions 22 are formed so as to be sloped at an angle with respect to the horizontal direction when the battery charger 10 is placed on a horizontal base. More specifically, the bottom surfaces 23 of the exposed step portions 22 are formed so as to be sloped downward with respect to the horizontal direction in response to the surfaces 23 extending to the front side. The slope angle of the bottom surfaces 23 is set to an angle allowing the water retained on the bottom surfaces 23 to flow downward due to the slope. Of the exposed step portions 22 of the protruding portions 21, the upper surface portions (the portions indicated by numeral 24) are also formed so as to be sloped by substantially the same angle as the bottom surfaces 23.

Further, as shown in FIG. 2 and FIG. 5, at lower ends of the slope 28 of the bottom surfaces 23 of the exposed step portions 22, there are formed drain ports 29 from which the water flows outside serving as drainage path leading outside. The drain ports 29 are formed as slits extending in the sloped direction at the lower ends of the slope 28. Since the bottom surfaces 23 of the exposed step portions 22 are sloped toward the front side, the lower ends of the slope 28 are located at the forefront sides of the protruding portions 21. Thus, the water retained on the bottom surfaces 23 flows toward the drain ports 29 located at the lowermost ends (lower ends of the slope 28), that is at the forefront sides of the protruding portions 21, and then flows outside through the drain ports 29.

As shown in FIG. 5 and FIG. 6, the case upper surface 31 constituting the upper surface of the case 11, which corresponds to the upper surface of the battery attachment portion 15, is formed so as to be sloped with respect to the horizontal direction as it extends toward the front side. That is, the case upper surface 31 is formed so as to be sloped to cause the water drained from the bottom surfaces 23 of the exposed step portions 22 to flow toward a front surface 35 constituting the front side surface of the case 11. The slope angle of the case upper surface 31 is set to be almost the same slope angle as that of the bottom surfaces 23. Thus, the water flows toward the front surface 35 at the same flow rate as the flows on the bottom surfaces 23.

Further, in the case front surface 35, there are formed recessed groove portions 36 that causes the water flowing out of the case upper surface 31 to flow toward the ground G on which the battery charger 10 is placed (which corresponds to the placing surface of the horizontal base of the present invention). The recessed groove portions 36 correspond to water passages according to the present invention. As shown in FIG. 2 and FIG. 5, they are formed us recessed grooves. The recessed groove portions 36 are formed so as to be in line with the sloped surface of the case upper surface 31. That is, no step is provided between the case upper surface 31 and the recessed groove portions 36, with the slope angle be maintained. The ground surface G on which the battery charger 10 is placed is a horizontal surface.

Figure 7:
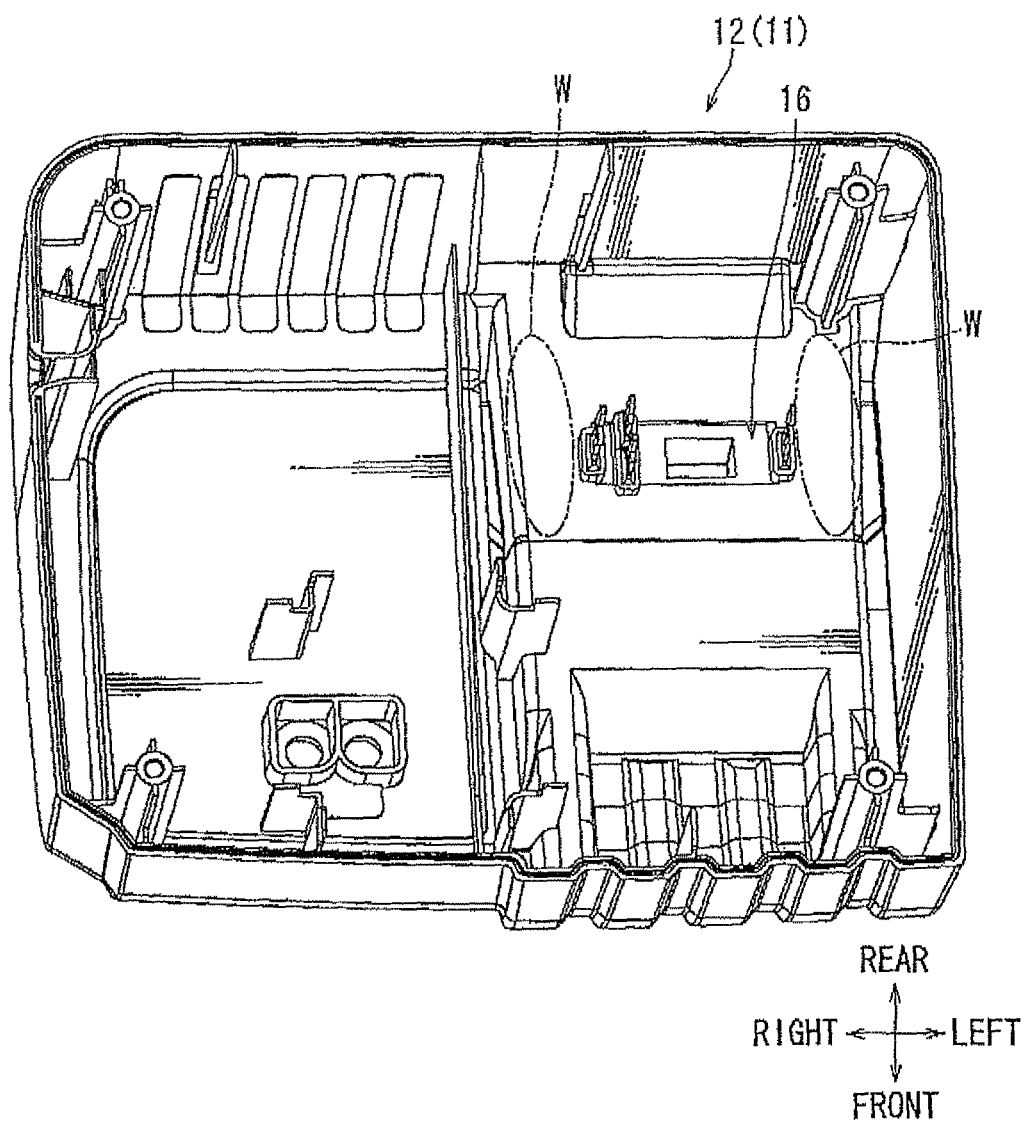
FIG. 7 is a back side perspective view of the back side of a case main body.

FIG. 7 is a backside perspective view of the case main body 12 showing the backside of the case main body 12. The above-described battery charger 10 provides the following effects.

In the battery charger 10 described above, the female guide portions 20 for slidingly attaching the battery pack B are formed by integral resin molding as a part of the case main body 12 (case 11) constituting the case of the battery charger 10. A mold is applied to the female guide portions 20 so as to reduce the thickness of the thick-walled portions thereof from the outer side (the upper side), whereby the exposed step portions 22 are formed, with the protruding portions 21 being formed as thin-walled portions. As a result, as indicated by a symbol W in FIG. 7, due to the stepped configuration of the exposed step portions 22, it is possible to form the protruding portions 21 (the guide portions 20) as thin-walled portions so as to prevent sink marks from producing at the time of resin molding. At the same time, there is not provided in the case main body 12 an opening communicating with the inner and outer side of the case that causes the water to enter. Further, the bottom surfaces 23 of the exposed step portions 22 are formed so as to be sloped with respect to the horizontal direction when the battery charger 10 is placed on the horizontal base, and thus, when the water is retained or the dust is accumulated on the bottom surfaces 23, it is possible to drain the water or the dust toward the lower side of the slope owing to the slope of the bottom surfaces 23.

As a result, when some water is dropped on the bottom surfaces 23 of the exposed step portions 22 for example, the water flows toward the front side 35 of the case due to the slope angle of the bottom surfaces 23. Further, the upper surface portions adjacent to the bottom surfaces 23 (the portions indicated by numeral 24) are formed so as to be sloped by the same angle as the bottom surfaces 23, and water dropped on the step upper surface portions (the portions indicated by numeral 24) flows toward the front surface 35 of the case due to this slope angle.

Further, in the above-described battery charger 10, the drain ports 29 are formed at the lower ends of the slope 28 of the bottom surfaces 23 of the exposed step portions 22, and it is possible to allow the water to be drained outside through the discharge ports 29 without hindering the water flow. The drain ports 29 are formed such that the direction in which water flows on the bottom surfaces 23 is in line with the direction in which the water is drained outside of the bottom surface 23, so that it is possible to drain the water without blocking a series of flows. As a result, it is possible to drain almost all the water drained on the bottom surfaces 23 of the exposed step portions 22. Even in a case where dust is likely to be caused to accumulate on the bottom surfaces 23 of the exposed step portions 22, the dust can be drained as well. Thus, in providing the female guide portions 20 for slidingly attaching the battery pack B as a part of the case main body 12 by integral resin molding, it is possible to form the female guide portions 20 as thin-walled portions without having to provide any opening communicating with the inner and outer side of the case main. body 12. Therefore, it is possible to solve the problem that the water or the dust may be retained or accumulated on the female guide portions 20. As indicated by the symbol W in FIG. 7, no opening communicating with the inner and outer side of the case main body 12 is provided on the back side portion thereof opposite the exposed step portions 22, and there is no need to provide the case main body 12 with a water passage structure for draining the water that has moved inside of the case 11. As a result, it is possible to simplify the structure of the back side of the case main body 12 constituting the inside of the case 11, which may increase an advantage from the viewpoint of a production cost and manufacturing procedure of the case 11.

Further, in the above-described battery charger 10, the drain ports 29 are formed in a slit-like configuration, so that it is possible to form the drain ports 29 at the same time of the molding of the case main body 12. As a result, there is no need to separately provide a process for forming the drain ports 29, which is advantageous from the viewpoint of the manufacturing procedure of the case 11.

Further, in the above-described battery charger 10, the battery charger 10 is placed on the ground surface G (the horizontal surface), and the case upper surface 31 of the case main body 12 is formed so as to be sloped with respect to the horizontal surface so that the water drained from the exposed step portions 22 may be caused to flow, as described above. Therefore, it is possible to prevent the water or the dust drained from the bottom surfaces 23 of the exposed step portions 22 from accumulating on the case upper surface 31. As a result, it is possible to leave the case upper surface 31 in a clean condition, with no water or dust being allowed to stay thereon.

Further, in the battery charger 10 described above, the base portion 17 of the electrical connection portion 16 is formed as a base that is arranged at a higher position (one step higher) than the case upper surface 31, and also the connection terminals 19 of the electrical connection portion 16 are fixedly supported by the base portion 17. As a result, the water dropped on the case upper surface 31 can flow without flowing through the collection terminals 19 due to the height of the base portion 17.

Further, in the battery charger 10 described above, the recessed groove portions 36 in the form of grooves are formed in the front surface 35 of the case, and due to the recessed groove portions 36, it is possible that the water flows out of the case upper surface 31 toward the ground surface G on which the battery charger 10 is placed. As a result, it is possible to drain the water to flow outside of the battery charger 10, leaving the case 11 in a clean condition.

In the battery charger 10 described above, a floating structure in the prior art is not used in the electrical connection portion 16, and also a support structure by a protective cover is not used in the case main body 12. Further, an inlet for cooling the air is not also used. As a result, the number of components of the case 11 can be reduced as compared with the prior art, making it possible to reduce a production cost. Further, the case main body 12 is provided with no opening portion, and thus a sealing of the case 11 can be improved.

The above construction may not be limited by the above-described example and various changes may be made without departing from the scope of the invention.

Figure 8:
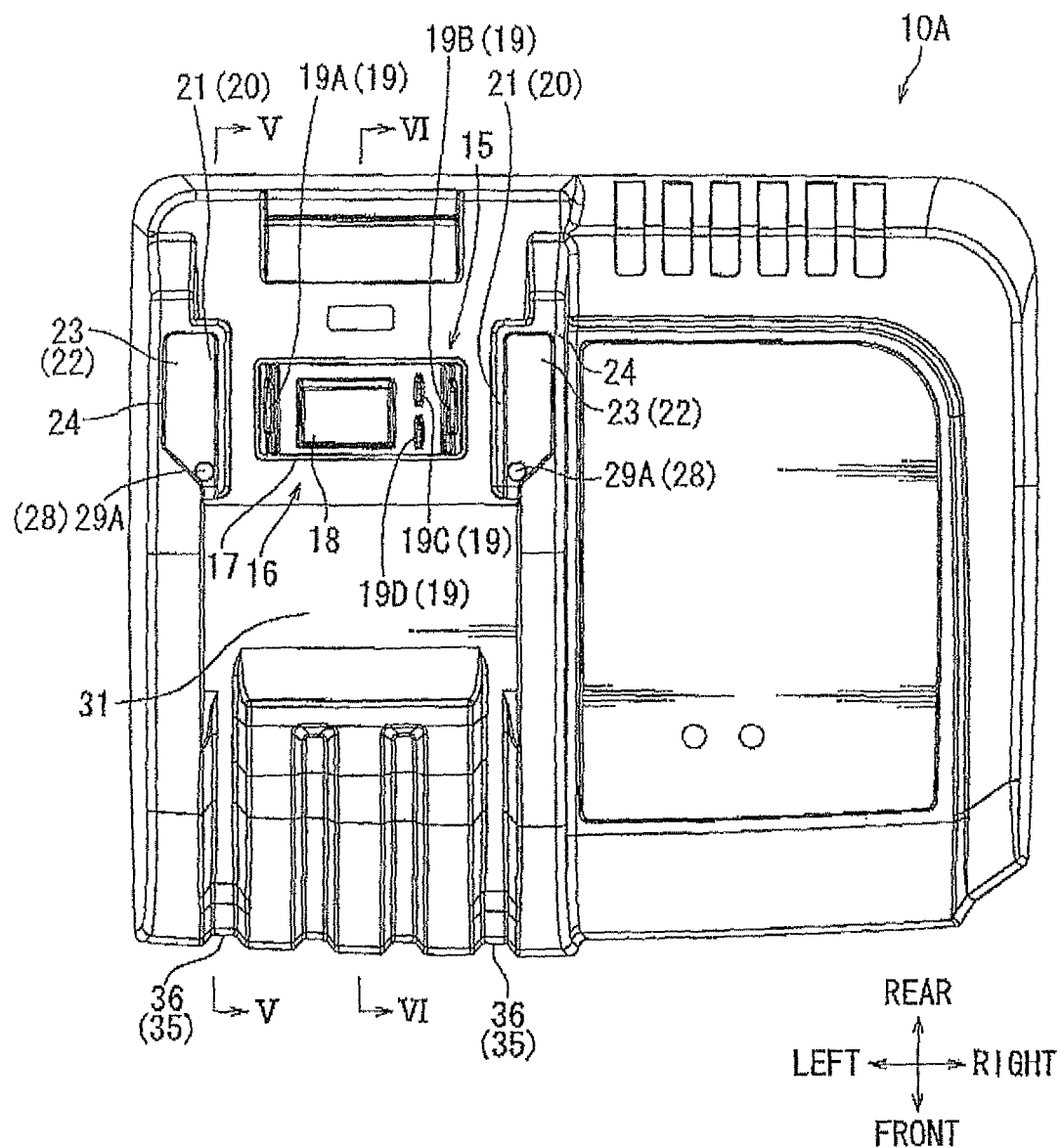
FIG. 8 is a plan view of the battery charger showing another example of a drainage path according to the present invention.

In the above-described battery charger 10, the drain ports 29 in the form of a slit extending in the sloped direction are formed in the exposed step portions 22 in response to the drainage paths according to the present invention. However, the drainage paths according to the present invention are not restricted to those of the above example, and it is also possible to adopt another example. FIG. 8 is a plan view of a battery charger 10A, showing drainage paths according to another example of the present invention. As shown in FIG. 8, at the lower ends of the slope 28 of the bottom surfaces 23 of the exposed step portions 22, there may be formed drain ports 29A extending downwardly through the bottom surfaces 23 in the form of a hole as the drainage paths. In the case where such drain ports 29A are provided, the bottom surfaces 23 of the exposed step portions 22 can be surrounded only by the side surfaces. In this case, the water drained on the bottom surfaces 23 flows toward the drain ports 29A located at the forefront surfaces of the protruding portions 21 (the lower ends of the slope 28), and after dropping on the case upper surface 31 from the drain ports 29A, the water flows outside of the case 11.

We claim:

1. A battery charger for charging a battery pack, comprising:
    a case serving as a casing of the battery charger, wherein the case comprises a guide portion for guiding and slidingly attaching the battery pack,
    wherein the guide portion is formed as a part of the case by integral resin molding and comprises a protruding portion protruding inwardly from a right side and left side of an attachment portion of the case for attaching the battery pack;
    wherein an exposed step portion is formed in the protruding portion, the exposed step portion being exposed upwardly away from an upper surface of the case and having a stepped configuration with a recessed portion; and
    wherein a bottom surface of the recessed portion is formed to be sloped with respect to the horizontal direction along an attaching direction of the battery pack.

2. The battery charger according to claim 1, wherein the protruding portion is formed in a concave configuration.

3. The battery charger according to claim 1, wherein the protruding portion is formed as a thin-walled portion so as to prevent producing of sink marks at the time of resin molding.

4. The battery charger according to claim 1, wherein a drain port serving as a drainage path that leads outside of the exposed step portion is formed at a lower end of the slope of the recessed portion of the exposed step portion.

5. The battery charger according to claim 4, wherein the drainage path is formed in a slit-like configuration.

6. The battery charger according to claim 1, wherein the upper surface of the case is formed so as to be sloped with respect to the horizontal direction so that water drained from the exposed step portion is caused to flow in the attaching direction of the battery pack.

7. The battery charger according to claim 1, wherein a water passage is formed in a side surface of the case in the form of a recessed groove, so that the water flowing in the upper surface of the case is caused to flow toward a surface on which the battery charger is placed.

8. The battery charger according to claim 6, wherein the slope angle of the bottom surface of the recessed portion is formed to be the same as that of the upper surface of the case.

* * * * *